(12) United States Patent
Imoehl

(10) Patent No.: US 6,832,593 B2
(45) Date of Patent: Dec. 21, 2004

(54) METHOD OF OPTIMIZING DIRECT INJECTOR TIP POSITION IN A HOMOGENEOUS CHARGE ENGINE FOR MINIMUM INJECTOR DEPOSITS

(75) Inventor: William James Imoehl, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 93 days.

(21) Appl. No.: 10/241,462

(22) Filed: Sep. 12, 2002

(65) Prior Publication Data

US 2004/0050359 A1 Mar. 18, 2004

(51) Int. Cl.$^7$ ............... F02M 65/00; F02B 77/08; G01M 15/00
(52) U.S. Cl. ............... 123/294; 73/119 A; 123/295
(58) Field of Search ............... 123/294, 295, 123/298, 305; 73/116, 119 A

(56) References Cited

U.S. PATENT DOCUMENTS

| | | | |
|---|---|---|---|
| 4,869,224 A | 9/1989 | Ishikawa et al. | 123/682 |
| 5,058,547 A | 10/1991 | Morikawa | 123/198 D |
| 5,220,895 A | 6/1993 | Curran et al. | 123/491 |
| 5,247,918 A | 9/1993 | Wakeman | 123/470 |
| 5,941,207 A | 8/1999 | Anderson et al. | 123/295 |
| 6,386,175 B2 | 5/2002 | Yang | 123/298 |
| 6,598,471 B2 * | 7/2003 | Imoehl | 73/119 A |
| 2002/0120171 A1 | 8/2002 | Avery et al. | 585/14 |
| 2003/0084713 A1 | 5/2003 | Imoehl | 73/119 |

FOREIGN PATENT DOCUMENTS

DE 19645201 6/1997 .......... F02M/61/14

OTHER PUBLICATIONS

D.J. Podnar and J.T. Kubesh, Southwest Research Institute, San Antonio, Texas; National Renewable Energy Laboratory (NREL); "Development of the Next Generation Medium–Duty Natural Gas Engine", Final Report; Feb. 2000; NREL/SR–540–27503; 58 pages.

(List continued on next page.)

Primary Examiner—Tony M. Argenbright

(57) ABSTRACT

A method of optimizing mounting position of a direct injection fuel injector tip to minimize injector tip deposit formation of selected internal combustion engines and direct injection fuel injectors. The combination can be different engines with different injectors or the same engine or the same injector but with different characteristics for the engine and injector. For each combination selected, the method involves generating at least two maps different maps. The first map is a map of the range of injector tip temperatures of a particular engine and injector combination. The first map is a rough indicator of a tendency towards combustion deposits. The second map is an engine characterization map that correlates testing conditions to actual combustion deposits formation. An optimization map is then generated from characteristic curves that permits selection of an optimal injector tip position with respect to the combustion chamber.

16 Claims, 9 Drawing Sheets

OTHER PUBLICATIONS

Paul W. Guthrie, Siemens; Society of Automotive Engineers, Inc., SAE Paper "A Review of Fuel, Intake and Combustion System Deposit Issues Relevant to 4–Stroke Gasoline Direct Fuel Injection Engines"; 2000; 12 pages.

Allen A. Aradi, Bill Imoehl, Noyes L. Avery, Paul P. Wells and Richard W. Grosser; Society of Automotive Engineers, Inc.; "The Effect of Fuel Composition and Engine Operating Parameters on Injector Deposits in a High–Pressure Direct Injection Gasoline (DIG) Research Engine" 99FL–436; 1999; 9 pages.

Souichi Matsushita; Toyota Motor Corporation; "Development of Director Injection S.I. Engine (D–4)" SAE; 1997.

Magnus Glavmo, Peter Spadafora and Russell Bosch; Delphi Automotive Systems; SAE Technical Paper Series; "Closed Loop Start of Combustion Control Utilizing Ionization Sensing in a Diesel Engine"; 1999.

Geoffrey Cathcart and Christian Zavier; Orbital Engine Company; Paper No. 00P–245; "Fundamental Characteristics of an Air–Assisted Direct Injection Combustion System as Applied to 4 Stroke Automotive Gasoline Engines"; 1999.

Ingemar Denbratt and Hakan Sandquist, PhD; CERC; "The Effect of Fuel Preparation on The Operational Characteristics of A Direct Injection Engine and Deposit Formation" (Apr. 10, 2001).

* cited by examiner

METHOD OF OPTIMIZING DIRECT INJECTOR TIP POSITION IN A HOMOGENEOUS CHARGE ENGINE FOR MINIMUM INJECTOR DEPOSITS

FIELD OF THE INVENTION

This invention relates to a direct injection fuel injector for an internal combustion engine.

BACKGROUND OF THE INVENTION

Combustion chamber deposits have been a cause of concern in gasoline internal combustion because such deposits are believed to affect, to name a few, driveability, emission, ignition plug fouling and degraded injector performance. In the case of a direct injection gasoline engine, deposits may be formed on the surfaces of the combustion chamber, valves, piston, injector and spark plugs. In particular, it is believed that these surfaces are often wetted with fuel, thereby increasing the likelihood of deposit formations. The formation of deposits on the surfaces of the injector is believed to cause flow capacity shift and spray pattern degradation that result in power loss, engine roughness and increased emissions for the direct injection gasoline engine. Moreover, it is believed that the direct injection fuel injector is especially affected since the injection pressure is oftentimes too low to mechanically dissociate the deposits that are formed on the wetted surfaces of the injector, such as the seat and needle or closure member.

Research on combustion deposits formations appears to indicate that the formation of deposits on the injector tip is dependent on a variety of factors including an injector tip temperature, injector protrusion into the combustion chamber, heat transfer from the injector to the coolant passages of the engine, types of fuel, surface geometry of the injector tip and coating or plating of the tip surfaces. The data also seems to indicate that where the injector tip temperature is above 110–140 degrees Celsius, a tendency for a formation of deposits is increased when the other factors are unchanged. Conversely, the data seems to indicate that below this temperature (approximately 120° Celsius), the tendency for the formation of injector tip deposits is greatly reduced when the other factors are held constant.

SUMMARY OF THE INVENTION

The present invention provides for a method of optimizing a fuel injector tip position of a direct-injection fuel injector for use with a pre-selected engine. The fuel injector tip for use with the engine being located at a first axial position relative to a combustion chamber of the engine. In one embodiment, the method can be achieved by generating at least one map of an engine that indicates engine load, engine speed and injector tip temperature over the operating range of the engine operating at a generally stochiometric fuel mixture for a plurality of different fuel injectors; selecting at least one fuel injector from the plurality of fuel injectors where the injector tip temperature over the engine operating range does not exceed a set value; and verifying whether the selected fuel injector includes a tendency to form injector tip combustion deposits.

The present invention further provides for a method of optimizing a mounting position of a high-pressure direct injector in a combustion chamber of an engine. The injector has a central axis extending between an inlet and an injector tip. The injector tip being disposed at a first axial position with respect to a surface of the combustion chamber. In another embodiment, the method can be achieved, in part, by generating at least one map that relates engine load, engine speed and injector tip temperature for an operating range of the engine, the combination operating at a generally stochiometric air-fuel mixture; determining changes in fuel flow through the injector when the combination is operated at one or more selected points of the at least one map over a selected period of time; generating at least one tip characteristic map that relates changes in fuel flow at selected speed points of the at least one map for a plurality of different axial positions of the injector tip; generating at least one tip optimization map as a function of: (i) the plurality of axial positions of the fuel injector tip; (ii) changes in fuel flow; and (iii) a range of engine loads at the selected speed points from the at least one tip characteristic map; and selecting an axial position of the fuel injector tip having a least amount of change in fuel flow over the range of engine loads from the at least one tip optimization map.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
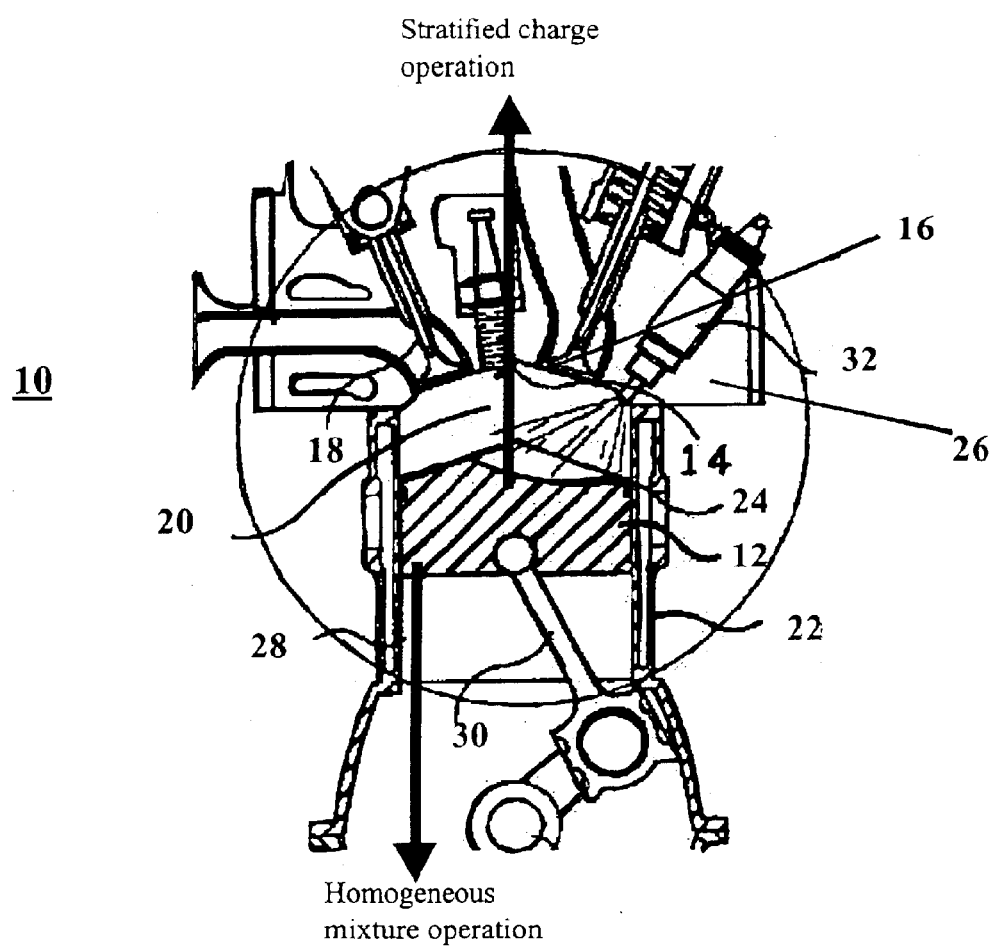
FIG. 1 is a cross-section view of a direct injection internal combustion engine that can be operated in homogenous or stratified charge mode.
Figure 2:
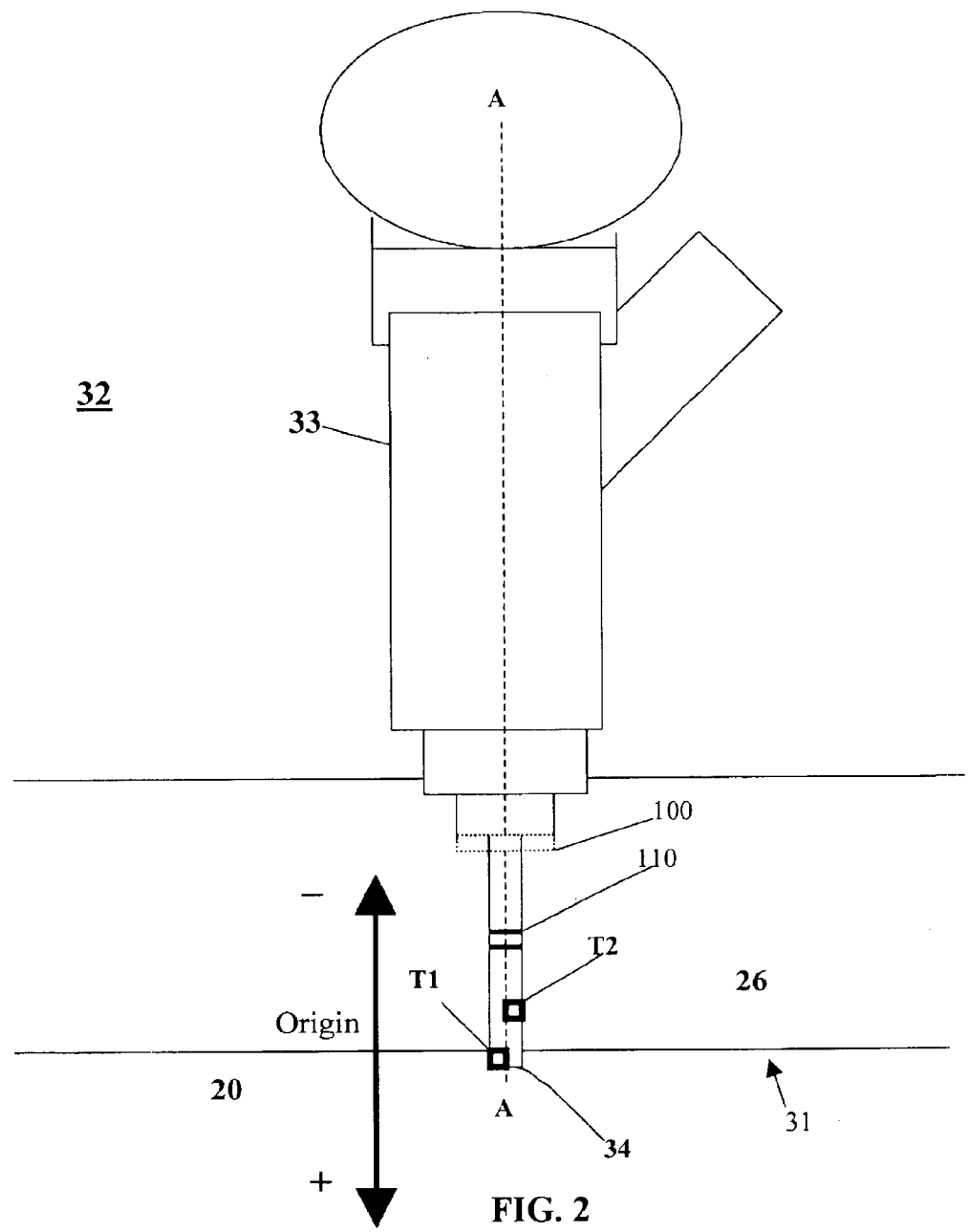
FIG. 2 is a simplified view of the location of the direct injector relative to a referential point in the combustion chamber.

Referring initially to FIGS. 1 and 2, a direct injection gasoline internal combustion engine 10 is shown having a piston 12 that cooperates with a spark plug 14, inlet valve 16, exhaust valves 18 to generate useful work by combusting fuel and air inside a combustion chamber 20. A cylinder 22, a piston head 24, and a cylinder head 26 define the combustion chamber 20. An expanding combustion charge (not shown) in the combustion chamber 20 forces the piston 12 to move downward, thereby causing connecting rod 30 to reciprocate in crankcase 28. To facilitate the ingress of fuel, a direct injection type fuel injector 32 is mounted to the cylinder head 26 so as to inject fuel directly into the combustion chamber 20.

Although the engine 10 is illustrated as a single cylinder utilizing at least one direct injection fuel injector, a multi-cylinder engine utilizing at least one direct injection fuel injector per cylinder can also be used. The engine 10 is operable in either a "homogeneous charge" combustion mode or a "stratified charge" combustion mode. As used here, homogeneous charge combustion mode indicates that the fuel is injected into the combustion chamber during an intake stroke of the engine 10 and typically ignited late in the compression stroke. Stratified charge combustion, on the other hand, is used here to indicate that the fuel is injected during a latter part of a compression stroke of the engine 10 with the intake of the engine being wide open or minimally throttled.

The injector 32, shown in schematic form in FIG. 2, includes a body 33 and an injector tip 34 that are disposed along a longitudinal axis A—A. As shown in FIG. 2, the injector tip 34 includes, but is not limited to, any surface of the injector 32 that is exposed to combustion gases, such as, for example, the seat, the valve body or the injector needle. Fuel flows through an inlet 35 and exits through the injector tip 34. Of course, the injector 32 can be also configured as a side feed rather than an axial or top feed type fuel injector as shown here, depending on the injector's operational requirements. Additionally, the injector 32 is configured such that the position of the injector tip 34 with respect to the cylinder head 26 can be adjusted. The injector can be coupled to the cylinder or cylinder head by mechanical coupling, such as, for example, a threaded insert in the cylinder head 26 with complementary threads formed on the body 33 along with washers which can be used to adjust an axial position of the tip 34 along the longitudinal axis A—A. Preferably, a washer or a spacer 100 is inserted into the injector cavity of the cylinder head to provide for axial adjustment of the injector relative to the cylinder head. Thereafter, the fuel injector is inserted into the cylinder head with a Teflon™ ring 110 mounted on the tip 34 of the injector so as to form a seal between the injector tip and the wall surfaces of the injector cavity. Another alternative can include machining a part of the shoulder of the fuel injector or the cylinder head so as to provide a preselected position of the fuel injector relative to the cylinder head.

At least one injector 32 can be equipped with at least one temperature sensing device proximate the injector tip 34. The temperature-sensing device can be infrared, resistance temperature detector, thermistors or a thermocouple type temperature sensor. Preferably two thermocouples, T1 and T2, are used to measure the temperature at two different locations on the injector tip 34. Other suitable locations can be utilized depending on various factors, such as, for example, the type of engine, injector, operating temperature or fuel type.

The injector 32 can be different types of direct injection fuel injector that can be mounted to different types of direct injection gasoline internal combustion engine such that, for any combination(s) of direct injection fuel injectors and engines, an optimum combination of engine and fuel injector can be found. Various characteristics of the engine or the fuel injector can also be used to further alter each combination of engine-fuel injector into yet other combinations. The characteristics are believed to be involved in determining an optimum engine-injector combination that tends to reduce combustion deposits. They can be any one or more combinations of the following characteristics, such as, for example: different engines, different fuel injectors, an engine operating in a stratified charge operational mode or homogeneous charge operational mode, operating cycles of the engine, injector tip position proximate the combustion chamber, insulated and non-insulated injector tip, material composition of the injector tip, coating or plating on the injector tip, surface polishing of the injector tip; fuel type, fuel additives, geometry of the injector seat, geometry of the needle, the seat sac volume, reduced bounce injector (by controlling the impact velocity of the injector tip on the seat during a closing of the injector), increased fuel flow, increased fuel flow and fuel pressure or air/fuel ratio. These characteristics listed herein are not intended to be an exhaustive list but are intended to be preferred characteristics.

To determine an optimum engine-injector combination, at least one Tip Temperature Map is preferably generated that will determine whether the selected engine-injector combination has a tendency to form combustion deposits on the injector tip 34. Preferably, more than one combination is evaluated. This Tip Temperature Map requires a mapping of the engine 10 operational characteristics at various speeds and load points to be performed. This by using a chassis type dynamometer or an engine dynamometer. Preferably, the engine 10 is coupled to an engine dynamometer and operated through various engine loads and speed points while maintaining the engine's air intake temperature and fuel temperature constant. As used here, engine load can be represented by either the mass of the air flow or air (mass) charge per stroke (shown here in FIG. 3A) when the engine 10 is operated as a homogeneous direct injection engine or by Brake-Mean-Effective-Pressure ("BMEP") (shown here in FIG. 4A) when the engine is operated as a stratified charge direct injection engine.

At least one Tip Temperature Map of either a homogeneous or stratified type direct injection engine can be acquired as follows. Initially, the injector 32, preferably at least one injector (such as one described, for example, in U.S. Pat. No. 5,247,918), is calibrated to a desired performance standard, and mounted at a first axial position (the first axial position being referenced to a referential datum) in each cylinder of a single or multi-cylinder engine. The engine 10 is then started and operated while inlet air and fuel temperatures to the engine 10 are held constant, for example, at 40 degrees Celsius (inlet dry air bulb at 40 degrees Celsius and inlet wet bulb temperature at 15 degrees Celsius). The fuel is preferably a standardized fuel with additive added to prevent coking during the engine mapping. When the engine 10 is at operating temperature, the engine is maintained at or near a fixed operating temperature (for example, a coolant temperature of 95 degrees Celsius and oil temperature of roughly about the same temperature). While at operating temperature, the coolant and oil temperature should be controlled so that they will remain within a predetermined temperature range. Also, while the engine 10 is operating under these conditions, the pulsewidth for the injectors are adjusted, at a specific speed and load, towards a value λ that approximates stochiometric air-fuel ratio. Here, λ is preferably between 0.8 and 1.0 times the stochiometric air-fuel ratio depending on the operational requirements of the engine 10. The speeds and loads are recorded for each selected speed point and load. The temperature readings of the injector tip 34 of each injector at the first axial position over the range of speed points and loads are also recorded throughout the dynamometer run in order to generate the Tip Temperature Map.

Figure 3A:
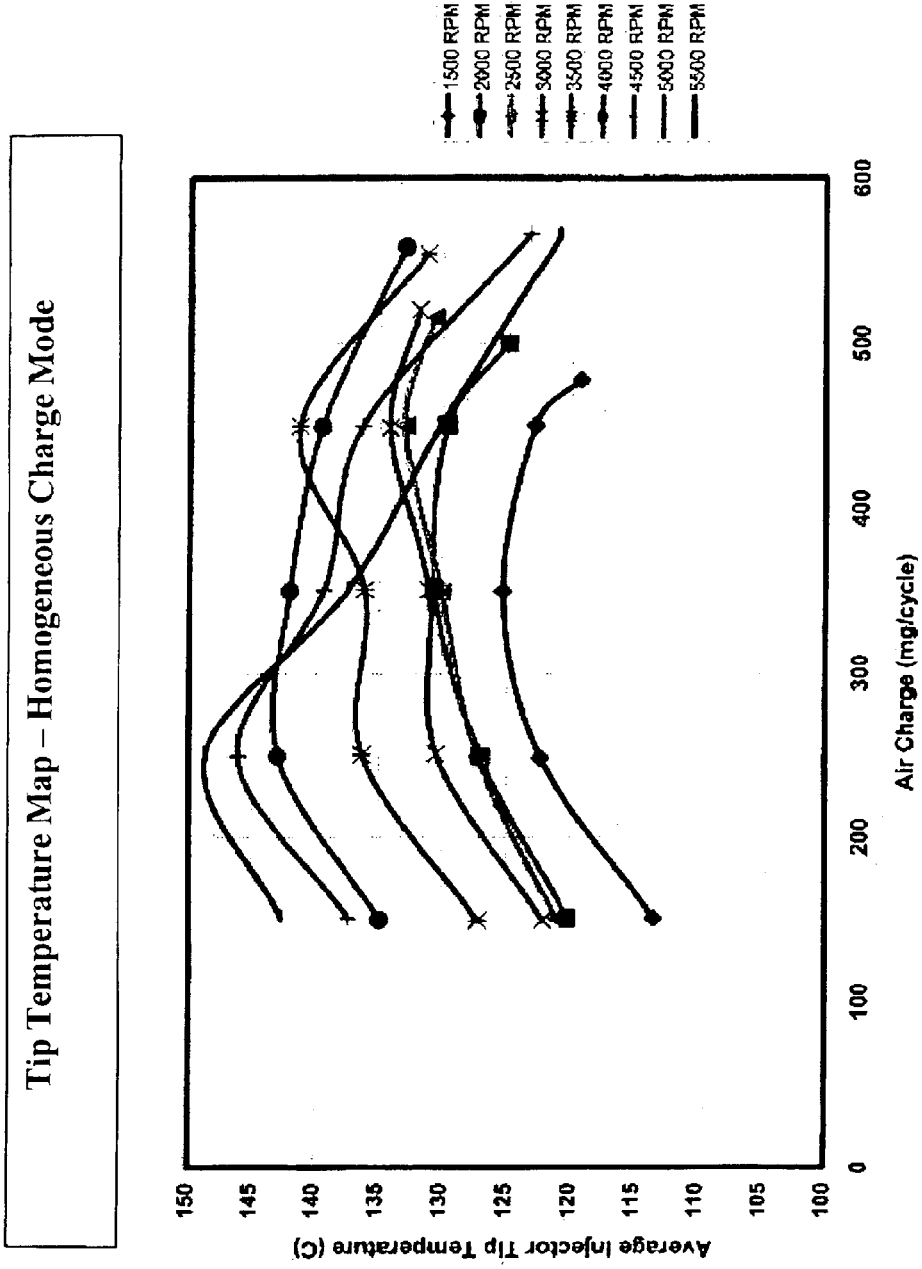
FIG. 3A is a Tip Temperature Map illustrating various average injector tip temperatures over an operating range (speeds and loads) of a homogeneous type direct injection engine with a particular fuel injector and engine combination.

As shown in FIG. 3A, a Tip Temperature Map can be generated for an engine operated in a homogeneous charge mode that indicates whether a particular engine and injector combination (including different characteristics for each combination) has a tendency to form combustion deposits when operated in a homogeneous charge mode. Here, the engine 10 is operated under various engine loads (measured as "air charge" in the case of a homogeneous charge direct injection engine) throughout the operating range of speeds for the engine. As one example, the engine 10 can be operated at a constant 5000 rpm with the engine load varying from 150 mg per combustion cycle ("mg/cycle") to 580 mg/cycle. The temperature of the injector tip is measured for this speed and plotted on a chart. The temperature plot of FIG. 3A shows that when the engine is at high speed (5000 rpm) while under light load (250 mg/cycle), the injector tip temperature is higher (145 degrees Celsius) as compared to the injector tip temperature (122 degrees Celsius) when the engine under a heavy load (580 mg/cycle) at the same speed (5000 rpm). The temperature, speed, load and speed-load-temperature are then used in the generation of at least one Tip Temperature Map that is indicative of the spectrum of injector tip temperatures across a particular engine's operating range.

Figure 4A:
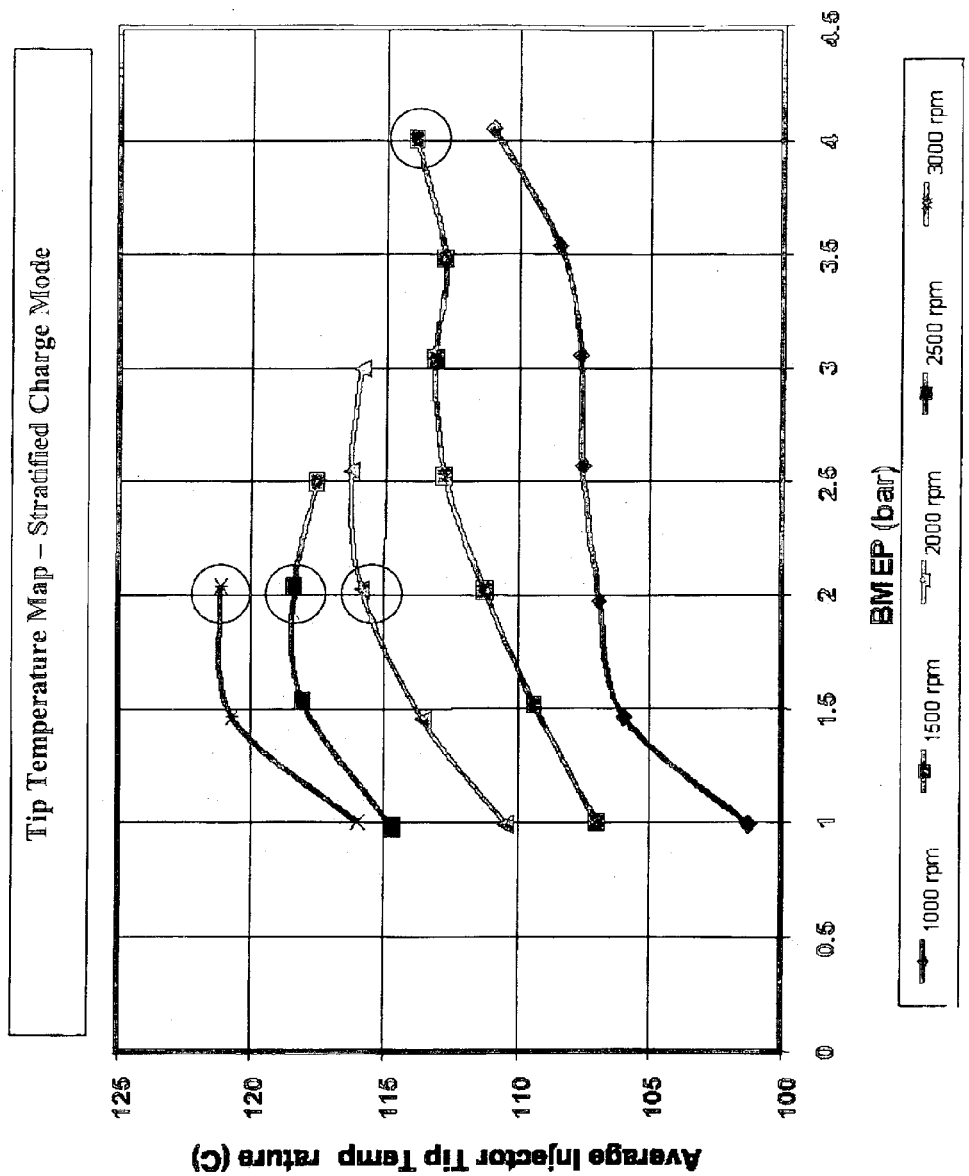
FIG. 4A is a Tip Temperature Map illustrating average injector tip temperatures over an operating range (speeds and loads) of a stratified charge direct injection engine with a particular fuel injector and engine combination.

Similarly, the map can also be used to determine whether a particular stratified charge direct injection engine and direct injector have a tendency to form combustion deposits. As shown in FIG. 4A, the particular stratified engine is operated (at approximately wide-open-throttle) through several different speed points, such as, for example, 1000 to 3000 rpm in 500 rpm increments. At a constant 1000 rpm or 1500 rpm, the load applied to the engine (calculated as Brake-Mean-Effective-Pressure BMEP) is varied through seven different engine-load points that encompass 1 to 4 bars of BMEP; at a constant 2000 rpm or 2500 rpm, the load is varied through four different engine-load points between 1 and 2.5 bars of BMEP; at a constant 3000 rpm, the engine-load is varied through three different load points between 1 and 2 bars of BMEP while the temperature of the direct fuel injector 32 (equipped with the thermocouples) at each load point for each engine speed is recorded. In other words, while the engine load is varied at each speed value, the temperature of the tip of the injector 32 is also recorded over the range of engine load and speed values. Similar to FIG. 3A, the temperature, speed, load and speed-load-temperature of the fuel injector 32 (at λ) are then used in the generation of at least one Tip Temperature Map in FIG. 4A that is indicative of the spectrum of injector tip temperatures across a particular engine's operating range.

The map of FIG. 3A or 4A is believed to be an indicator of whether the particular engine and direct injector combination has a tendency to form combustion deposits. By evaluating the map (FIG. 3A or 4A), a decision maker can decide if this particular engine-injector combination, in all likelihood, will or will not have a tendency towards excessive combustion deposits. If the map indicates that the range of injector tip temperatures over the operating range of the combination is less than approximately 120 degrees Celsius, the evaluation of the combination can end here. Otherwise, different combinations can be evaluated until a desired temperature range is achieved.

Evaluation of the map of FIG. 3A indicates that there is a possibility that the direct injector used in this particular homogeneous-charge direct injection engine will result in excess combustion deposits in operational service. At this point in the evaluation of the combination of engine and fuel injector, a manufacturer can intervene as necessary, such as, for example by a design change or by changing the injector, engine, the factors listed above or various combinations thereof.

Evaluation of a stratified charge engine and a particular direct injector in FIG. 4A seems to indicate that a tendency for combustion deposits to be formed over the operating range of the particular engine-injector combination tested may be low when the particular combination is placed in actual service.

As noted previously, where the injector tip temperature is greater than about 110–140 degrees Celsius, it is believed that injector tip deposits formation is greatly accelerated. Therefore, the maps of FIGS. 3A and 4A are believed to be one predictor of the formation of injector tip deposits. As such, the maps of FIGS. 3A and 4A can be used to evaluate a particular engine-injector or different engine or injector characteristics for each combination of engine and injector for even more different combinations that can be evaluated.

Figure 5:
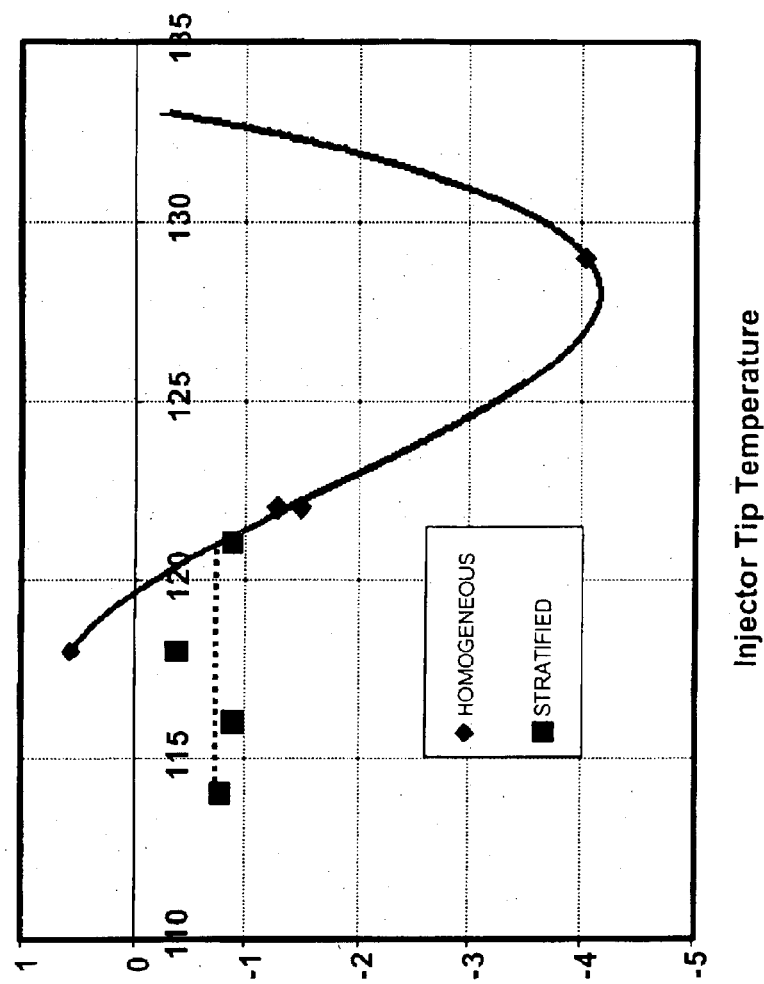
FIG. 5 is an engine-characterization map generated from a plurality of data points selected from the Tip Temperature Map of FIG. 3A or FIG. 4A, with each data point being used to operate the engine while monitoring changes in fuel flow for the duration of the test such as one point in either FIG. 3B or 4B.

Another predictor of the formation of injector tip deposits can be by an engine characterization map, shown here in FIG. 5. In order to generate the engine-characterization map, at least several speed and load points, preferably four or more, on the Tip Temperature Map (FIG. 3A or 4A) are selected.

Figure 3B:
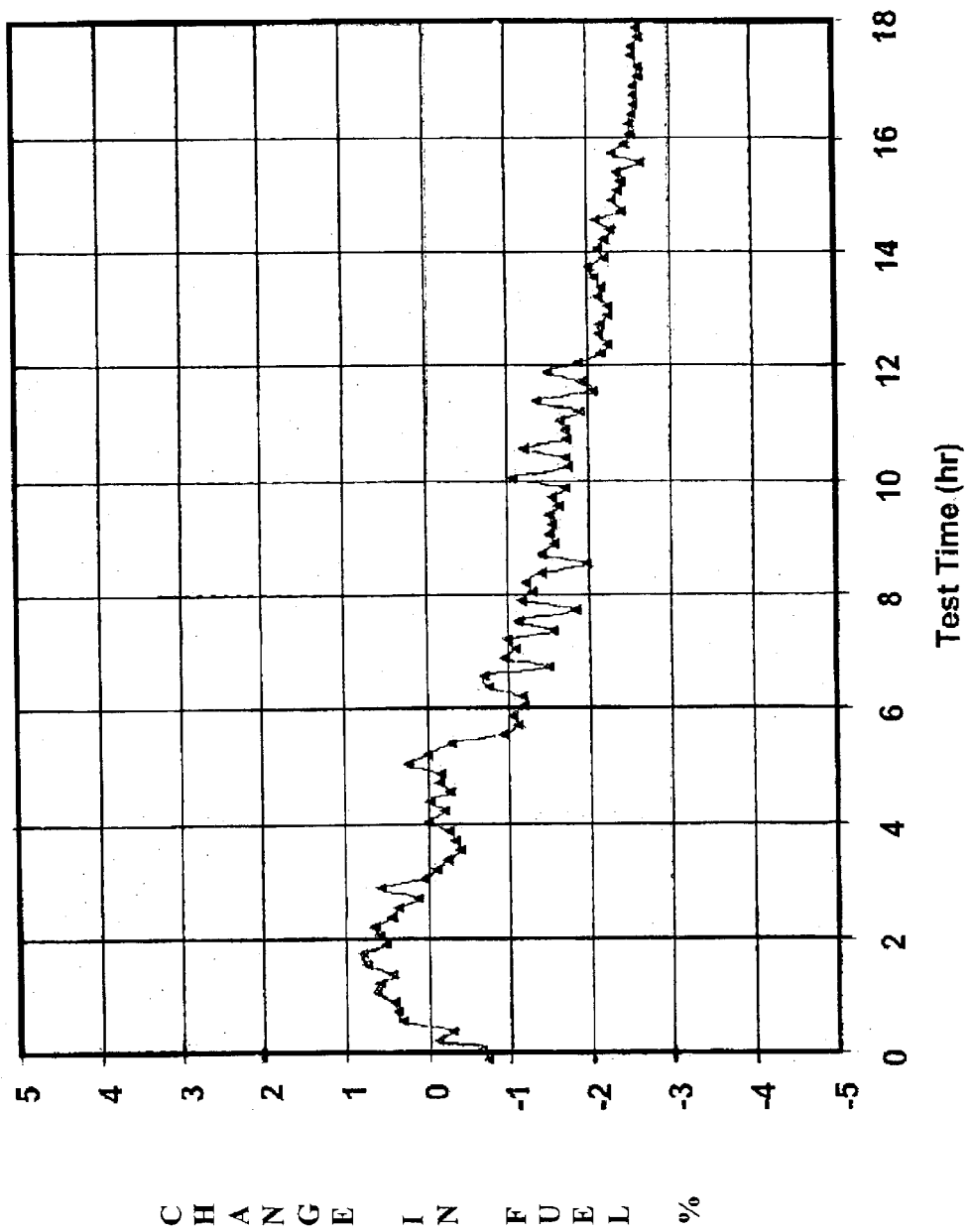
FIG. 3B illustrates the changes in fuel flow at a speed-load point selected from the map of FIG. 3A.

As an example of an engine characterization mode for an engine operating in a homogeneous charge mode, a speed and load point is selected from the Tip Temperature Map of FIG. 3A. The engine is then operated continuously at each speed-load-temperature point for up to 18 hours or more while changes in fuel flow are recorded. Although a plot of fuel changes is shown for only one fuel injector is shown in FIG. 3B for one speed-load point selected from FIG. 3A, it should be understood that in actual testing, changes in fuel of all the injectors for a plurality of speed-load points (such as in FIG. 3A) for an engine are plotted together. In the simplified example of FIG. 3B, this plot is believed to be indicative of injector plugging due to combustion deposits that seems to stabilize at −2.8% after 12 or more hours of testing at the selected speed and load point of FIG. 3A.

Figure 4B:
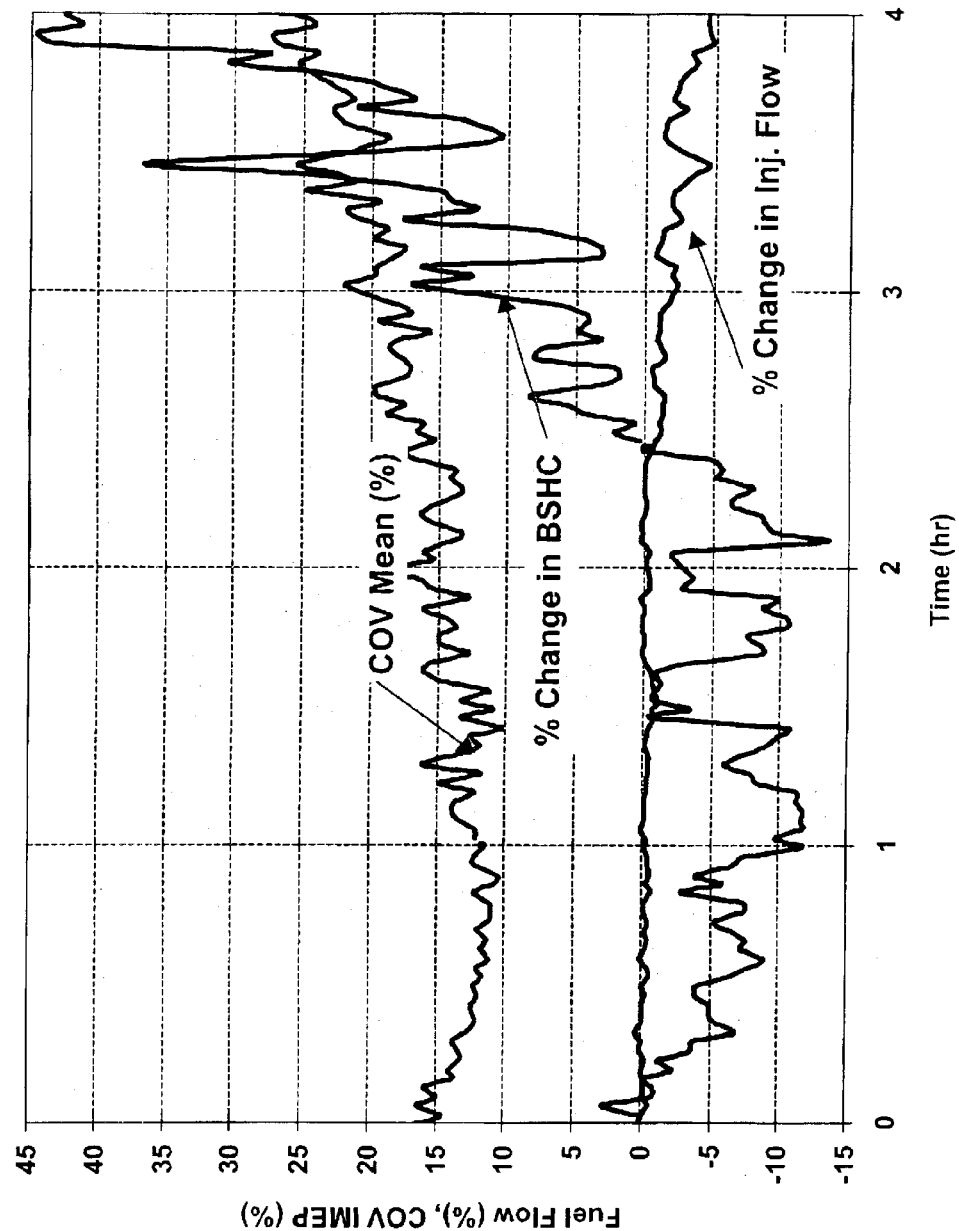
FIG. 4B illustrates the changes in fuel flow due to combustion deposits on the injector and various other data at a speed and load point selected from FIG. 4A that should be monitored to ensure that the stratified engine is operating within acceptable limits of emission, combustion stability and other factors.

Likewise, for an engine operating in a stratified charge mode, several speed and load points are selected from the map of FIG. 4A, then the engine is operated at one selected speed and load point for a specified duration while changes in fuel flow are monitored. In the simplified example of FIG. 4B, an injector flow was reduced by approximately 5% over 4 hours of testing while the engine is operated at one of various speed and load points selected from the map of FIG. 4A. Although a plot of fuel changes is shown for only one fuel injector at only one speed-load point for FIG. 4B, it should be understood that in actual testing, changes in fuel of all the injectors in an engine are plotted together for a plurality of speed-load points selected from FIG. 4A. It should be also noted that, unlike a homogeneous charge engine, a stratified charge engine requires additional monitoring of combustion stability (% COV mean (Coefficient of Variation)), emission (% BSHC (Brake-Specific- Hydrocarbon)) in addition to changes in fuel flow (% fuel flow) over time during mapping of the stratified charge engine, shown here in FIG. 4B, and optionally misfiring rate (not shown).

As described herein, changes in fuel flow are believed to be indicative of injector tip deposits formation and therefore are used as one convenient means of inferring relative levels of injector tip deposits formation. Alternatively, fuel flow changes can also be measured directly as is known to those skilled in the art. The changes in fuel flow are believed to correlate closely with spray quality and actual formations of combustion deposits when the combination is in actual service in a vehicle.

To complete the map of FIG. 5, several speed-load-temperature points on the map of FIG. 3A (homogenous charge mode) and/or FIG. 4A (stratified charge mode) can be selected. The engine is then operated at these selected speed-load-temperature points from each respective map of FIG. 3A or 4A as previously described with respect to FIG. 3B or 4B. The changes in fuel flow, for each mode, (taken from either FIG. 3B or 4B) are then plotted as different points on the map of FIG. 5 with respect to tip temperature and percent fuel flow change.

In particular, FIG. 5 includes two curves that describe the critical operating range for the same particular engine operated in both homogenous charge and stratified charge modes. When this particular engine combination is operated in the homogeneous charge mode, denoted by a curved solid line (representing five selected speed-load-temperature points selected from a map such as one shown, for example, in FIG. 3A, with fuel flow being monitored for each speed-load point for eighteen hours or more), indicates that this particular engine and injector with their respective characteristics will, in all likelihood, have a problem with excessive combustion deposits over its operating cycle.

On the other hand, when this particular engine is evaluated in the stratified charge mode, a dashed line (representing four selected speed-load points selected from a map such as, for example, one shown in FIG. 4A, with the engine operating at each selected point for 4 or more hours, while fuel flow changes are monitored), indicates that this particular engine-injector combination will not, in all likelihood, have a tendency to form combustion deposits on the injector under actual operating cycles. This curve is optimal because the drop in fuel flow is less than 1% while the tip temperature is no greater than about 122 degrees Celsius.

Thus, the method of selecting at least one optimal combination of direct injection engine and direct fuel injector from a plurality of combinations, where each engine or each injector having characteristics selected from a plurality of engine and fuel injector characteristics, can be summarized as follows.

A specific engine is selected along with a specific fuel injector. The specific engine and the specific injector may have some, all or none of the following characteristics such as, for example, one of stratified or homogeneous type engines, operating cycles of the engine, injector tip position proximate the combustion chamber, insulated and non-insulated injector tip, material composition of the injector tip, coating or plating on the injector tip, surface polishing of the injector tip; fuel type, fuel additives, geometry of the injector seat, geometry of the needle, the seat sac volume, reduced bounce injector (by controlling the impact velocity of the injector tip on the seat during a closing of the injector), increased fuel flow, increased fuel flow and fuel pressure or air/fuel ratio. This engine and fuel injector combination, ("engine-injector combination") is then used in generating at least one Tip Temperature Map (such as, for example, FIG. 3A or 4A) that plots engine load, engine speed and injector tip temperature (while monitoring the pulsewidth or fuel flow required for $\lambda$ operation) over an engine operating range (with the air and fuel inlet temperatures remaining constant over the engine operating range).

The Tip Temperature Map is then evaluated to determine if any point on the Tip Temperature Map has an injector tip temperature greater than a threshold temperature. If so, there are at least three alternatives. One alternative involves changing one or more of the characteristics listed above and then performing one or more Tip Temperature Maps. Another alternative involves changing to a different engine or a different injector combination and performing one or more Tip Temperature Maps. A third alternative can be by generating the engine characteristics map (similar to FIG. 5) where the Tip Temperature Map is ambiguous or where the decision maker is desirous of obtaining a more accurate predictor of combustion deposits when other parameter(s) such as, for example, material composition of the injector tip, coating or plating on the injector tip, surface polishing of the injector tip, fuel type, fuel additives, geometry of the injector seat, geometry of the needle, the seat sac volume, reduced bounce injector (by controlling the impact velocity of the injector tip on the seat during a closing of the injector), increased fuel flow, increased fuel flow, increased fuel pressure or air/fuel ratio is (are) changed.

In other words, the Tip Temperature Map (FIG. 3A or 4A) is believed to be a predictor of temperature of the fuel injector tip over the operating range of a particular combination of engine, fuel injector and other parameters. However, whenever parameters affecting tip temperature are changed, such as, for example, flow characteristics, surface energies, material compositions or fuel compositions, the engine characterization map, such as, for example, FIG. 5, is believed to be required in order to predict the effect of the changes of the parameters on the formation of combustion deposits. Moreover, the engine characterization map allows a comparison of various engines to injector's combination or even the same engine and injector but with different characteristics for either the engine (stratified or homogenous charge mode) or injector that is, in effect, another combination that can be evaluated.

The engine characteristic map can be used to further accurately gauge whether combustion deposits are likely to be formed at an excessive rate when various parameters are changed. As noted previously, one of the parameters affecting combustion deposits formation can be related to the position of the tip 34 of the fuel injector relative to the combustion chamber. By using data in conjunction with additional testing, a process for optimizing injector tip position has been developed, which is hereafter described.

Figure 6:
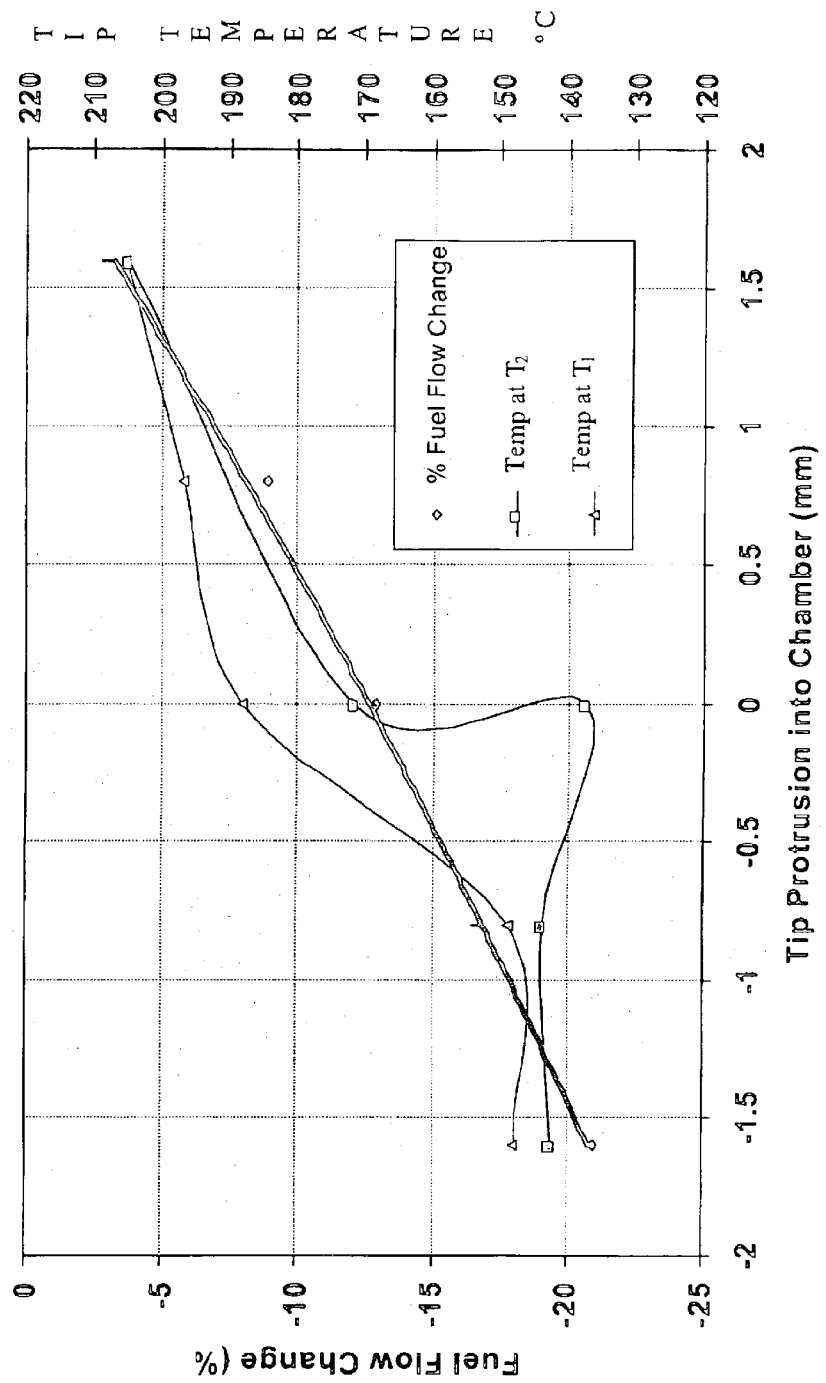
FIG. 6 is one example of a Tip Characteristic Curve that can be generated by analyzing each nodes of the Tip Temperature Map of FIG. 3A or FIG. 4A.

The tip optimization process requires selecting several speed and aircharge points (nodes), preferably four to eight nodes, from the Tip Temperature Map of FIG. 3A, operating a particular engine with a particular direct injection fuel injector at the node (with each node having a different engine speed and air charge) while monitoring for changes in fuel flow and tip temperature as the positions of the injector are changed so as to generate a plurality of Tip Characteristic Curves, an example being FIG. 6. The plurality of Tip Characteristic Curves is then used in generating an Optimization Curve, one being illustrated in FIG. 7.

To generate a Tip Characteristic Curve of FIG. 6, a node defined by engine speed of 2500 RPM at 500 milligram (of air) per intake stroke of the Tip Temperature Map of FIG. 3A is selected as one of several nodes. In generating the Tip Characteristic Curve of FIG. 6, the selected engine (including the injector(s)) is warmed up to baseline test conditions as described above. It should be noted that, preferably prior to the optimization process, a first thermocouple T1 is mounted at one predetermined position on the injector tip 34, and a second thermocouple T2 is mounted at another predetermined position on the tip 34, shown here in FIG. 2. The position of the injector tip 34 is then referenced with respect to the combustion chamber surface 31 such that when the tip 34 is generally flush with the surface 31, the position being designated as a null o "0.0." That is, as the tip 34 protrudes away from surface 31 into the combustion chamber, its positions with respect to the surface 31 are defined by positive values while the positions of tip 34 retracting into the cylinder head 26 with respect to surface 31 are defined by negative values. Once baseline test conditions are achieved, data is collected while the engine operates (at this node of 2500 RPM with 500 mg/stroke) for approximately 6–8 hours at each axial position of the injector tip 34. For example, as shown in FIG. 6, data is collected for injector tip position at a null position; at 0.5 millimeter; at 1.5 millimeter and at 2.0 millimeter of protrusion into the combustion chamber. Data is also collected for injector tip retraction into the cylinder head at –0.5 millimeter; at –1.5 millimeter and at –2.0 millimeter. Data collected from all injectors for this particular engine can also be processed and plotted as an average of all injectors on the same map—shown as a solid line in FIG. 6.

The data collected includes tip temperatures from each of the thermocouples T1 & T2 and percent flow change in fuel over the duration of the test of this one node. As shown in FIG. 6, at null or 0 position, the temperatures of T1 and T2 are 190° Celsius and 170° Celsius, respectively. The changes in fuel over a duration of four to eight hours for each axial position are then plotted on FIG. 6.

FIG. 6 shows that this particular combination of engine and injectors, operating at this particular node, tends to have little or no combustion deposits (due to the approximately 3% change in fuel flow) of the injector tip when the injector tip 34 protrudes approximately +1.7 millimeter into the combustion chamber despite the injector tip temperature being 210° Celsius. FIG. 6 also shows that the opposite is true—retracting the injector tip 34 approximately 1.5 millimeter into the cylinder head tends to generate combustion deposits that clog the tip, producing approximately 21% change in fuel flow over the duration of the test.

Because the Tip Characteristic Curve of FIG. 6 presents a picture of deposit formation at one node, more than one node should be analyzed for coking formation so as obtain an accurate as possible picture of the formation of combustion deposits. To that end, several nodes are then analyzed in the same manner as described with respect to FIG. 6. After all the selected nodes have been analyzed, one injector tip position is selected from amongst all the tip positions previously analyzed. The data from each of the nodes at one selected tip position are then plotted as a function of percent flow change and air charge so as to generate a Tip Optimization Map, such as one shown here in FIG. 7.

Figure 7:
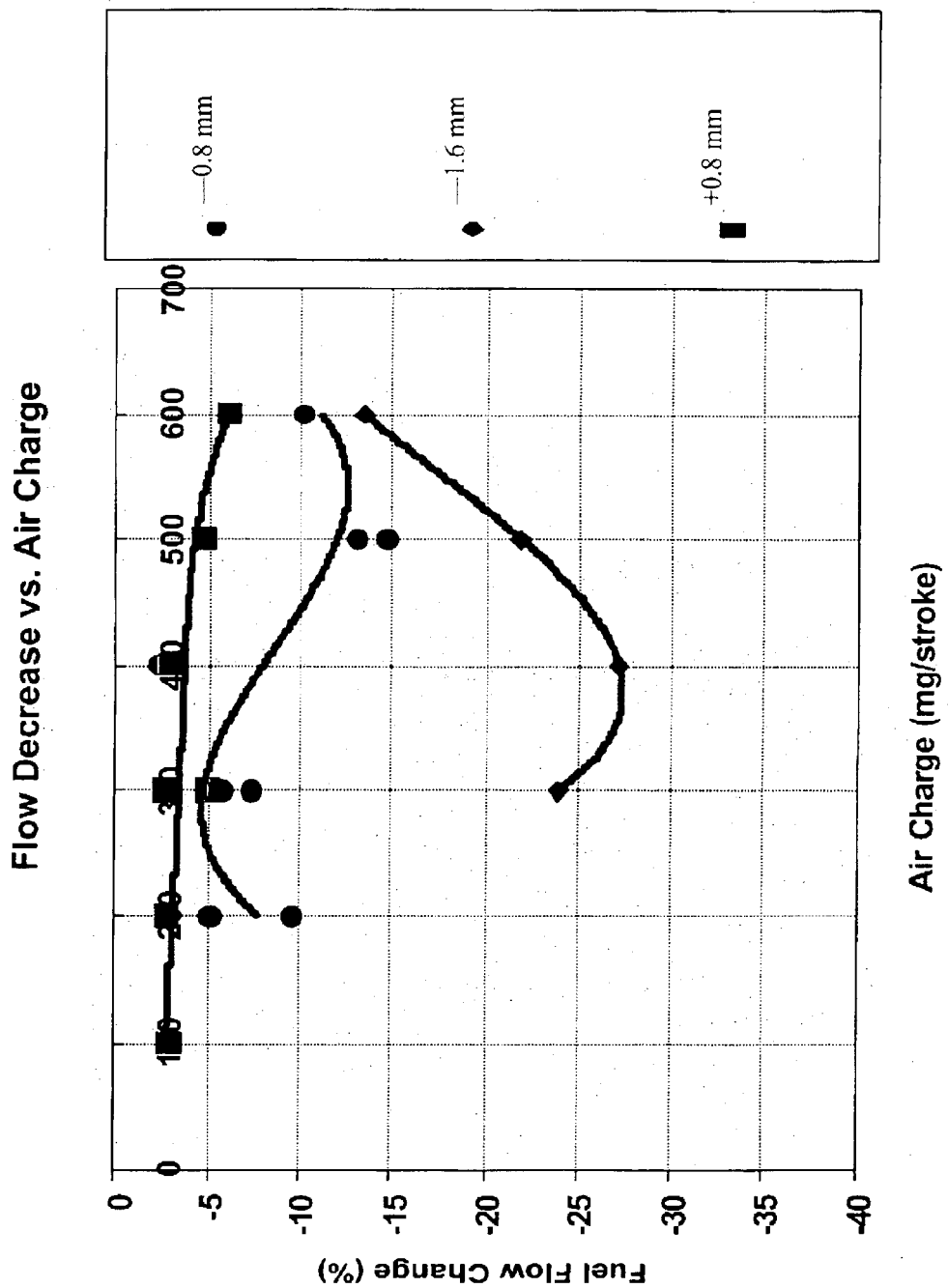
FIG. 7 is one example of a Tip Optimization Map that can be generated from one or more Tip Characteristic Curves of FIG. 6.

In FIG. 7, three different curves can be used to describe combustion deposit formation as a function of injector tip position over various engine loads (i.e. air charge). Out of these curves, one can be selected that minimizes change in fuel flow or combustion deposits. For example, the curve denoted by ■ indicates that this particular combination of injector and engine tends to have minimal combustion deposits at low to medium engine load at a tip position of 0.8 millimeter. The curve connected by ● for a tip position of –0.8 millimeter recessed into the cylinder head indicates a similar pattern but at exaggerated levels. The curve connected by ♦ indicates that combustion deposits are a problem even though the injector tip is recessed into the cylinder head at –1.6 millimeter. Thus, one skilled in the art would conclude that the optimum tip position for this particular combination of fuel injector and engine would be one where the injector protrudes +0.8 millimeter into the combustion chamber.

To recap, the method of optimizing a mounting position of a high-pressure direct injector in a combustion chamber of an engine can be performed by (a) generating at least one map that relates engine load, engine speed and injector tip temperature for an operating range of the engine, the engine operating at a generally stochiometric air-fuel mixture, illustrated exemplary in FIG. 3A or 4A; (b) determining changes in fuel flow through the injector when the engine is operated at one or more selected points of the at least one map over a selected period of time, illustrated exemplary in FIG. 3B or 4B; (c) generating at least one tip characteristic map that relates changes in fuel flow at selected speed points of the at least one map for a plurality of different axial positions of the injector tip, illustrated exemplary in FIG. 6; (d) generating at least one tip optimization map as a function of the plurality of axial positions of the fuel injector tip; changes in fuel flow; and a range of engine loads at the selected speed points from the at least one tip characteristic map, shown exemplary in FIG. 7, and by (e) selecting an axial position of the fuel injector tip having a least amount of change in fuel flow over the range of engine loads from the at least one tip optimization map. Additionally, the method can be implemented by generating another map whenever at least one of the injector tip temperatures over the operating range is greater than a predetermined value. The generating of the tip characteristic map can require monitoring temperature of the injector as the injector tip position is varied with respect to the combustion chamber or operating the engine in a homogeneous direct injection combustion mode. It should be noted that the determining feature of the method also includes maintaining an intake of the airmass to the engine constant at the at least one selected speed point, by operating the engine in a closed-loop mode, and monitoring a pulse-width of the fuel injector required to maintain the closed-loop mode, by selecting a plurality of speed points over a plurality of engine loads representative of an entire range of injector tip temperatures from the at least one map and monitoring changes in fuel flow, or by maintaining a substantially constant inlet air temperature, a substantially constant fuel temperature, and a substantially constant engine coolant temperature over the at least one operating range.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A method of optimizing a fuel injector tip position of a direct-injection fuel injector for use with a pre-selected engine, the fuel injector tip being located at a first axial position relative to a combustion chamber of the pre-selected engine, the method comprising:

generating at least one map of the engine that indicates engine load, engine speed and injector tip temperature over the operating range of the engine operating at a generally stochiometric fuel mixture for a plurality of different fuel injectors;

selecting at least one fuel injector from the plurality of fuel injectors where the injector tip temperature over the engine operating range does not exceed a set value from the at least one map; and verifying whether the selected fuel injector comprises a tendency to form injector tip combustion deposits.

2. The method of claim 1, wherein the verifying includes:

(a) determining changes in fuel flow through the at least one injector when the engine is operated at one or more selected points of the at least one map over a predetermined period of time;

(b) generating at least one tip characteristic map that relates changes in fuel flow at selected speed points of the at least one map for a plurality of different axial positions of the injector tip relative to the combustion chamber;

(c) generating at least one tip optimization map as a function of:
 (i) the plurality of axial positions of the fuel injector tip;
 (ii) changes in fuel flow; and
 (iii) a range of engine loads at the selected speed points from the at least one tip characteristic map; and (d) selecting an axial position of the fuel injector tip having a least amount of change in fuel flow over the range of engine loads from the at least one tip optimization map.

3. The method as claimed in claim 2, wherein the determining further comprises maintaining the engine load substantially constant at the at least one selected speed point.

4. The method as claimed in claim 2, wherein the generating of the at least one tip characteristic map includes monitoring temperature of the injector as the injector tip position is varied with respect to the combustion chamber.

5. The method as claimed in claim 2, wherein the determining further includes operating the engine in a closed-loop mode, and monitoring a pulsewidth of the fuel injector required to maintain the closed-loop mode.

6. The method as claimed in claim 2, wherein the determining further comprises selecting a plurality of speed points of the at least one map that are representative of an entire range of injector.

7. The method as claimed in claim 1, wherein the generating of the at least one map at predetermined engine operating conditions comprises maintaining a substantially constant inlet air temperature, a substantially constant fuel temperature, and a substantially constant engine coolant temperature over the at least one operating range.

8. The method of claim 1, wherein the generating of the at least one map further includes operating the engine in a homogeneous direct injection combustion mode.

9. A method of optimizing a mounting position of a high-pressure direct injector in a combustion chamber of an engine, the injector having a central axis extending between an inlet and an injector tip, the injector tip disposed at a first axial position with respect to a surface of the combustion chamber, the method comprising:

(a) generating at least one map that relates engine load, engine speed and injector tip temperature for an operating range of the engine, the engine operating at a generally stochiometric air-fuel mixture;

(b) determining changes in fuel flow through the injector when the engine is operated at one or more selected points of the at least one map over a selected period of time;

(c) generating at least one tip characteristic map that relates changes in fuel flow at selected speed points of the at least one map for a plurality of different axial positions of the injector tip;

(d) generating at least one tip optimization map as a function of:
 (i) the plurality of axial positions of the fuel injector tip;
 (ii) changes in fuel flow; and
 (iii) a range of engine loads at the selected speed points from the at least one tip characteristic map; and (e) selecting an axial position of the fuel injector tip having a least amount of change in fuel flow over the range of engine loads from the at least one tip optimization map.

10. The method as claimed in claim 9, wherein the generating another map whenever at least one of the injector tip temperatures over the operating range is greater than a predetermined value.

11. The method as claimed in claim 10, wherein the determining further includes maintaining an intake of the airmass to the engine constant at the at least one selected speed point.

12. The method as claimed in claim 11, wherein the generating of the at least one tip characteristic map includes monitoring temperature of the injector as the injector tip position is varied with respect to the combustion chamber.

13. The method as claimed in claim 12, wherein the determining further includes operating the engine in a closed-loop mode, and monitoring a pulsewidth of the fuel injector required to maintain the closed-loop mode.

14. The method as claimed in claim 11, wherein the determining further includes selecting a plurality of speed points over a plurality of engine loads representative of an entire range of injector tip temperatures from the at least one map and monitoring changes in fuel flow.

15. The method as claimed in claim 11, wherein the determining further includes maintaining a substantially constant inlet air temperature, a substantially constant fuel temperature, and a substantially constant engine coolant temperature over the at least one operating range.

16. The method of claim 9, wherein the generating of the at least one map further includes operating the engine in a homogeneous direct injection combustion mode.

* * * * *